United States Patent [19]
Matsubara et al.

[11] Patent Number: 4,627,295
[45] Date of Patent: Dec. 9, 1986

[54] VORTEX FLOW METER
[75] Inventors: Naoki Matsubara; Hideo Numata; Yutaka Ogawa, all of Tokyo, Japan
[73] Assignee: Oval Engineering Co., Ltd., Tokyo, Japan
[21] Appl. No.: 821,222
[22] Filed: Jan. 21, 1986

Related U.S. Application Data
[63] Continuation of Ser. No. 554,155, Nov. 15, 1983, abandoned.

[30] Foreign Application Priority Data
Nov. 25, 1982 [JP] Japan .................................. 57-206800
Nov. 25, 1982 [JP] Japan .................................. 57-206801
Jul. 26, 1983 [JP] Japan .......................... 58-116935[U]
Jul. 26, 1983 [JP] Japan .......................... 58-116936[U]
Jul. 26, 1983 [JP] Japan .......................... 58-116937[U]
Sep. 22, 1983 [JP] Japan .......................... 58-146888[U]

[51] Int. Cl.$^4$ .............................................. G01F 1/32
[52] U.S. Cl. ............................. 73/861.24; 73/DIG. 4
[58] Field of Search ........... 73/861.22, 861.23, 861.24, 73/DIG. 4

[56] References Cited
U.S. PATENT DOCUMENTS

| | | | |
|---|---|---|---|
| 3,823,610 | 7/1974 | Fussell, Jr. ........................ | 73/861.24 |
| 3,927,566 | 12/1975 | Zanker ........................... | 73/861.24 X |
| 3,972,232 | 8/1976 | Miller et al. ..................... | 73/861.24 |
| 4,069,708 | 1/1978 | Fussell, Jr. ....................... | 73/861.24 |
| 4,083,241 | 4/1978 | Herzl ............................. | 73/861.24 |
| 4,088,020 | 5/1978 | Sgourakes et al. ................ | 73/861.24 |
| 4,186,599 | 2/1980 | Frick ............................. | 73/861.24 |
| 4,201,084 | 5/1980 | Ito et al. ......................... | 73/861.22 |
| 4,248,098 | 2/1981 | Sawayama et al. ................ | 73/861.24 |
| 4,257,277 | 3/1981 | Klobe ............................ | 73/861.24 |
| 4,339,957 | 7/1982 | Herzl ............................. | 73/861.24 |
| 4,362,061 | 12/1982 | Yokogawa et al. ................ | 73/861.24 |
| 4,434,668 | 3/1984 | Shinoda et al. ................... | 73/861.22 |
| 4,437,350 | 3/1984 | Tamura et al. ................... | 73/861.24 |
| 4,448,081 | 5/1984 | Kolitsch et al. ................... | 73/861.24 X |
| 4,453,416 | 6/1984 | Knudsen ......................... | 73/861.24 |
| 4,475,405 | 10/1984 | Corpron et al. .................. | 73/861.24 |
| 4,520,678 | 6/1985 | Koziol et al. ..................... | 73/861.24 |
| 4,526,040 | 7/1985 | Matsubara ....................... | 73/861.24 |
| 4,559,832 | 12/1985 | Burlage et al. ................... | 73/861.24 |

FOREIGN PATENT DOCUMENTS

| | | | |
|---|---|---|---|
| 200046 | 3/1983 | German Democratic Rep. ................... | 73/861.24 |
| 161357 | 12/1979 | Japan ............... | 73/861.24 |
| 123428 | 7/1983 | Japan ............... | 73/861.24 |

Primary Examiner—Robert Spitzer
Attorney, Agent, or Firm—Jordan and Hamburg

[57] ABSTRACT

A vortex flow meter includes a bluff body which sheds a vortex train when a fluid flowing in a conduit moves therepast, the vortex train developing a delicate pressure variation in proportion to a flow rate of the fluid. The flow meter detects the flow rate by sensing the pressure variation and then converting it into an electric signal by means of a piezoelectric element or the like. A pressure sensor is detachably mounted in a pressure sensing chamber, which is defined in an internal space of the bluff body, and comprises a pressure receiving plate displaceable in response to the pressure variation, a sensor member such as a piezoelectric element for converting the displacement into an electric signal. The pressure receiving plate is arranged such that major part thereof is located in the conduit, while major part of the sensor member is located in a wall of the conduit and the outside thereof. The side surfaces of the pressure receiving plate are oriented parallel to or perpendicular to a direction of flow of the fluid. A drain port is located below a pressure induction port which is formed in a bottom portion of the pressure sensing chamber, so that part of the fluid entering the pressure sensing chamber is discharged through the drain port. The bottom wall of the pressure sensing chamber is inclined radially outwardly or formed with an upright wall. A flange for mounting the pressure sensor on the outer wall of the conduit and a cylindrical member for accommodating the sensor member are formed independently of each other and then welded together by an electron beam or the like. A support wall for fixing the cylindrical member extends from the flange. A second sensor member identical in construction with the first is employed to compensate for externally derived vibrations which may act on the pressure sensor. Leads extending out from the pressure sensor have a small rigidity.

18 Claims, 16 Drawing Figures

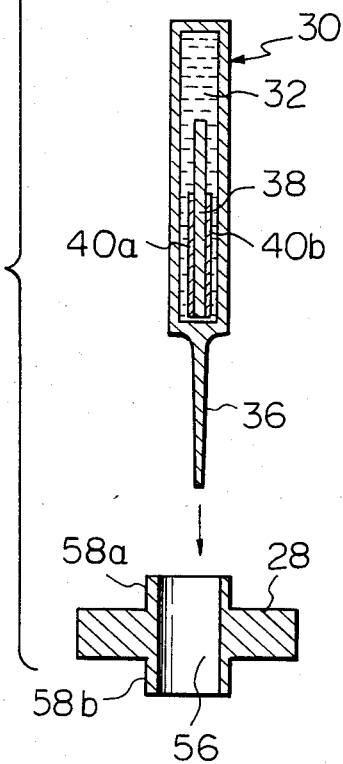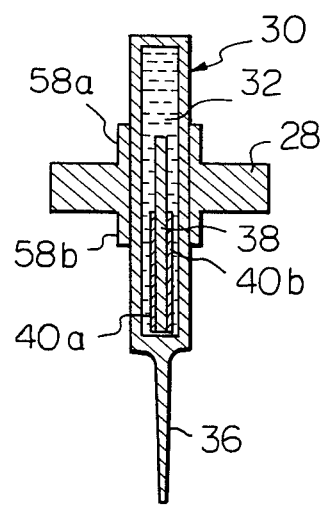

VORTEX FLOW METER

This application is a continuation of application Ser. No. 554,155 filed Nov. 15, 1983 now abandoned.

BACKGROUND OF THE INVENTION

The present invention relates to an improved vortex flow meter for measuring the velocity and flow rate of a fluid flowing through a conduit by sensing a delicate pressure variation caused by a vortex train, which a buffle body disposed in the conduit sheds on the movement of the fluid past the buffle body, and converting the sensed pressure variation into an electric signal by means of a piezoelectric element or the like.

An example of vortex flow meters of the type described is disclosed in Japanese Utility Model Publication No. 46-21501/1971. This prior art vortex flow meter includes a strain gauge or like displacement sensor mounted on a membrane such as a diaphragm, so that a displacement sensed by the sensor is transformed into an electric signal. Such a flow meter construction, however, suffers from various drawbacks as enumerated below due to the inherent location of the sensor inside a narrow space formed in a bluff body.

(1) The flow meter cannot be manufactured, machined or assembled with ease due to the intricacy of construction.

(2) A large displacement cannot be sensed on account of the limited space available for the displacement of the sensor, whereby the sensitivity attainable with the flow meter is poor.

(3) The sensor is arranged to remain in direct contact with the fluid flowing through the conduit and, therefore, it is apt to be damaged to shorten the service life thereof.

(4) Any externally derived vibration is imparted to the sensor by way of the conduit or leads which are connected to the sensor. The external vibration is introduced as noise into a pressure variation component resulted from the vortex train, thereby noticeably lowering the sensing accuracy.

SUMMARY OF THE INVENTION

It is therefore an object of the present invention to provide a vortex flow meter which is easy to manufacture, machine and assemble.

It is another object of the present invention to provide a vortex flow meter which features excellent sensitivity.

It is another object of the present invention to provide a vortex flow meter which desirably functions over a long time.

It is another object of the present invention to provide a vortex flow meter which is capable of measuring pressure variations with accuracy without being effected by external vibrations.

It is another object of the present invention to provide a generally improved vortex flow meter.

A vortex flow meter for measuring a flow rate of a fluid flowing through an internal space of a conduit by sensing a pressure variation which occurs in proportion to the flow rate of the present invention comprises a bluff body disposed in the internal space of the conduit to face the flow of the fluid and having a pressure sensing chamber defined in an internal space thereof, the pressure sensing chamber having an upper pressure induction passageway and a lower pressure induction passageway, a pressure receiving member disposed in the internal space of the bluff body to be displaceable in response to the pressure variation, a sensor member arranged to be positioned in a wall portion of the conduit and outwardly thereof, and a cylindrical member mounted in the wall portion of the conduit and connected to the pressure receiving member at a lower end thereof, the cylindrical member accommodating the sensor member fixed in place in an internal space thereof.

In accordance with the present invention, a vortex flow meter includes a bluff body which sheds a vortex train when a fluid flowing in a conduit moves therepast, the vortex train developing a delicate pressure variation in proportion to a flow rate of the fluid. The flow meter detects the flow rate by sensing the pressure variation and then converting it into an electric signal by means of a piezoelectric element or the like. A pressure sensor is detachably mounted in a pressure sensing chamber, which is defined in an internal space of the bluff body, and comprises a pressure receiving plate displaceable in response to the pressure variation, a sensor member such as a piezoelectric element for converting the displacement into an electric signal. The pressure receiving plate is arranged such that major part thereof is located in the conduit, while major part of the sensor member is located in a wall of the conduit and the outside thereof. The side surfaces of the pressure receiving plate are oriented parallel to or perpendicular to a direction of flow of the fluid. A drain port is located below a pressure induction port which is formed in a bottom portion of the pressure sensing chamber, so that part of the fluid entering the pressure sensing chamber is discharged through the drain port. The bottom wall of the pressure sensing chamber is inclined radially outwardly or formed with an upright wall. A flange for mounting the pressure sensor on the outer wall of the conduit and a cylindrical member for accommodating the sensor member are formed independently of each other and then welded together by an electron beam or the like. A support wall for fixing the cylindrical member extends from the flange. A second sensor member identical in construction with the first is employed to compensate for an externally derived vibrations which may act on the pressure sensor. Leads extending out from the pressure sensor have a small rigidity.

The above and other objects, features and advantages of the present invention will become apparent from the following detailed description taken with the accompanying drawings.

BRIEF DESCRIPTION OF THE DRAWINGS

FIG. 1b is a section along line 1b—1b of FIG. 1a;

FIG. 2a is a vertical section of a modification to the embodiment shown in FIG. 1a;

FIG. 2b is a section along line 2b—2b of FIG. 2a;

FIGS. 3a and 3b are vertical sections showing other modifications to the embodiment of FIG. 1a;

FIGS. 4a and 4b are vertical sections of a modification to the pressure sensor included in the embodiment of FIG. 1a.

DESCRIPTION OF THE PREFERRED EMBODIMENTS

Figure 1A:
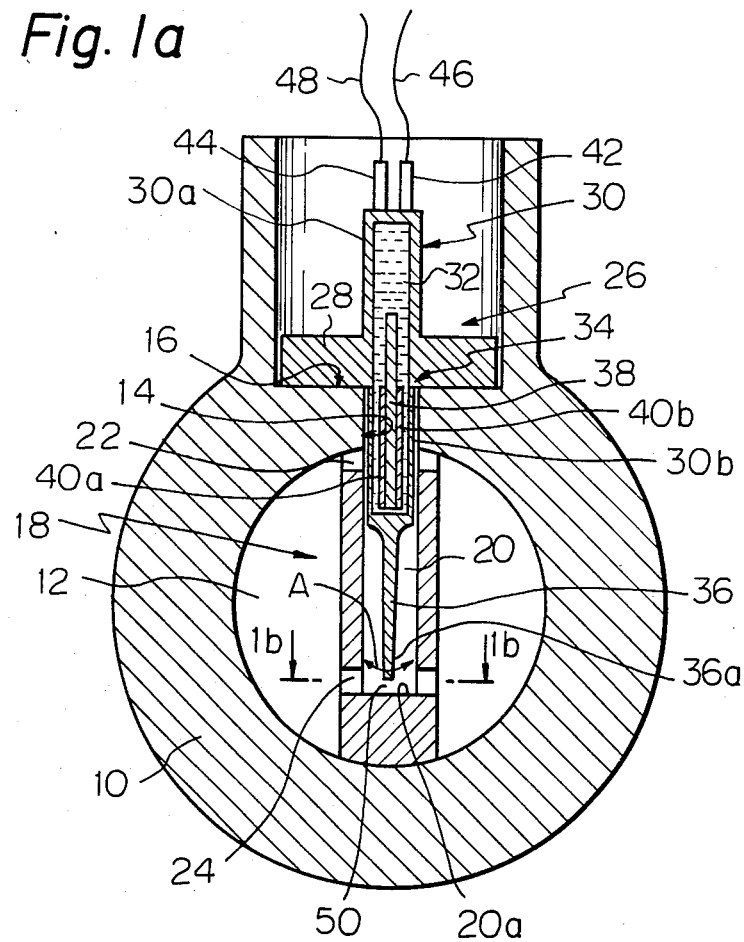
FIG. 1a is a vertical section of a vortex flow meter embodying the present invention.

While the vortex flow meter of the present invention is susceptible of numerous physical embodiments, depending upon the environment and requirements of use, substantial numbers of the herein shown and described embodiments have been made, tested and used, and all have performed in an eminently satisfactory manner.

Referring to FIGS. 1a–1e of the drawings, a vortex flow meter embodying the present invention is shown as being disposed in a conduit 10.

As shown, the conduit 10 has a space 12 defined therein for the passage of liquid, gas or like fluid whose flow rate is to be measured. An opening 14 extends throughout the conduit 10 to communicate the space 12 to the outside. The outer wall of the conduit 10 is machined in a portion thereof where the opening 14 is located, the machined portion defining a flat surface 16 as illustrated.

The vortex flow meter includes a bluff body or vortex shedder generally designated by the reference numeral 18. The bluff body 18 is disposed in the space 12 of the conduit 10 to face the flow of the fluid and may have a triangular cross-section as illustrated in FIG. 1b by way of example. A central portion of the bluff body 18 is bored to have a relatively wide space which is substantially common in inside diameter to the through opening 14 in the conduit 10 and intercommunicated to the opening 14. This space in the bluff body 18 is adapted to sense pressure variations due to a vortex train as will be described. Pressure induction passageways 22 and 24 extend throughout the bluff body 18 in upper and lower portions of the space or pressure sensing chamber 20 respectively. As shown in FIG. 1b, each of the pressure induction passageways 22 and 24 is located to oppose both sides of a flat pressure receiving plate 36, which will be described.

A pressure sensor, generally 26, is detachably mounted in the intercommunicated opening 14 and pressure sensing chamber 20 in order to convert a pressure variation due to a vortex train into an electric signal. As best shown in FIGS. 1c—1e, the pressure sensor 26 comprises a flange 28 rigidly connected to the flat surface 16 of the conduit 10 by suitable connecting means, a relatively thin-walled hollow cylindrical member 30 which is substantially bisected by the flange 28 into an upper portion 30a and a lower portion 30b intercommunicated with the upper cylinder 30a, and a sensor member 34 rigidly mounted in the bore of the hollow cylindrical member 30 by means of an electrically insulative filling agent 32. The flat pressure receiving plate 36 extends downwardly from one end of the cylindrical member 30, i.e., lower end of the lower cylindrical portion 30b, to protrude into the pressure sensing chamber 20 in the bluff body 18 in such a manner as to bisect it.

The sensor member 34 is made up of a resilient substrate 38 extending substantially along the axis of the cylinder 30, and a pair of piezoelectric elements 40a and 40b which are bonded to opposite surfaces of the substrate 38. These structural elements of the sensor 34 are fixed in place together by the filling agent 32 inside the cylinder 30. The substrate 38 and the piezoelectric elements 40a and 40b are electrically connected to terminals 42 and 44 on the upper cylinder portion 30a respectively. Leads 46 and 48 respectively extend from the terminals 42 and 44 to an electric measuring circuit (not shown). Preferably, the piezoelectric elements 40a and 40b bonded to the surfaces of the substrate 38 are covered with a ceramic material and then fixed in place by glass or like filling agent.

In operation, when the fluid passes the bluff body 18 while flowing through the internal space 12 of the conduit 10, the bluff body 18 sheds a vortex train at both sides thereof in a well known manner in accordance with a velocity of the fluid. The vortex train is introduced as a pressure variation into the pressure sensing chamber 20 via the upper and lower pressure induction passageways 22 and 24, thereby developing a delicate fluctuation in the pressure inside the chamber 20. In response to the pressure variation, the pressure receiving plate 36 associated with the cylinder 30 oscillates as indicated by an arrow A in FIG. 1a and this oscillation is imparted to the substrate 38 and piezoelectric elements 40a and 40b. Such a displacement is transformed by the piezoelectric elements 40a and 40b into an electric signal which is then applied via the leads 46 and 48 to the electric measuring circuit. Thus, the instantaneous flow velocity and flow rate of the fluid in the conduit 10 are determined.

Noteworthy features of the vortex flow meter described above are as follows.

(1) The pressure receiving plate 36 integral with the cylinder 34 of the pressure sensor 26 extends vertically through the pressure sensing chamber 20, which is formed vertically in the bluff body 18 over a substantial cross-sectional area. The plate 36, therefore, allows a pressure variation due to a vortex train to be sensed as a substantial displacement and, thereby, contributes a great deal to the improvement in sensitivity.

(2) The pressure receiving plate 36 and the sensor member 34 of the pressure sensor 26 are arranged at entirely different positions: the plate 36 within the bluff body 18 and the sensor member 34 within the cylinder 30 and above the bluff body 18. This prevents the sensor member 34 from directly contacting the fluid flowing in the conduit 10, that is, the sensor member 34 withstands a long time of use with hardly any damage caused thereto.

Figure 1B:
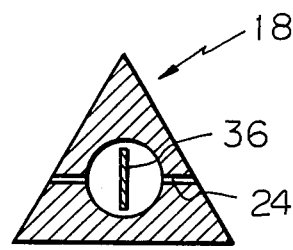
Figure 1C:
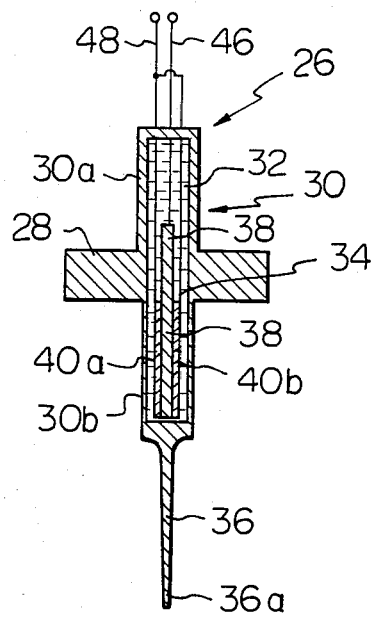
FIGS. 1c and 1d are fragmentary views of the vortex flow meter shown in FIG. 1a representing electric connection of a pressure sensor installed therein.
Figure 1D:
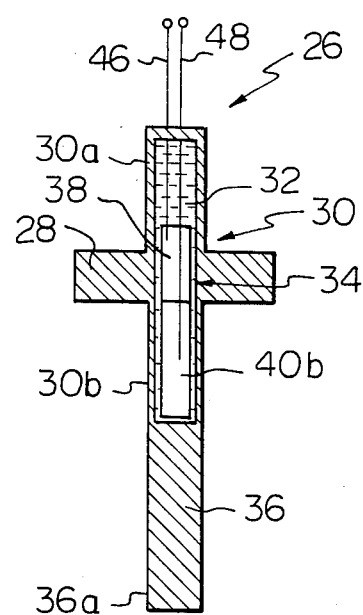
Figure 1E:
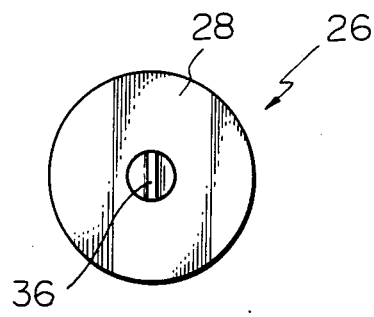
FIG. 1e is a bottom plan view of the pressure sensor shown in FIG. 1c.
Figure 2A:
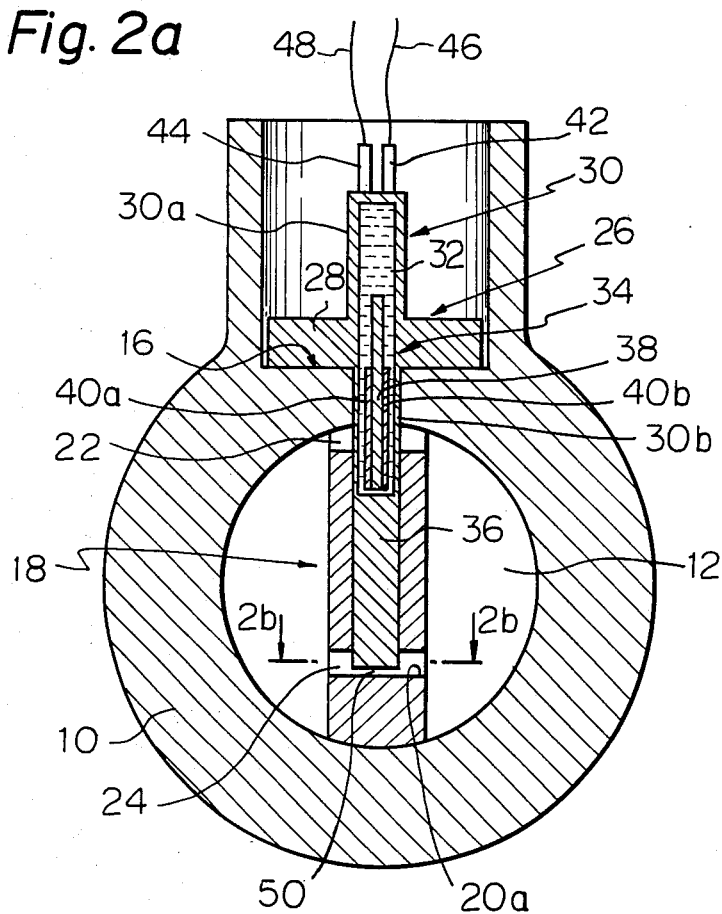
Figure 2B:
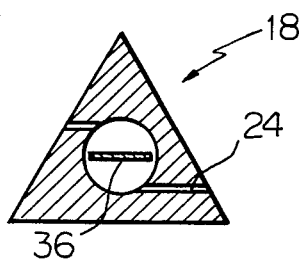
Figure 2C:
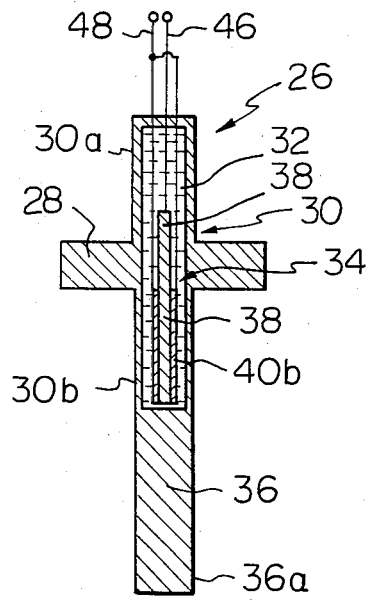
FIGS. 2c and 2d are fragmentary views of the modified flow meter shown in FIG. 2a representing electric connection of a pressure sensor installed therein.
Figure 2D:
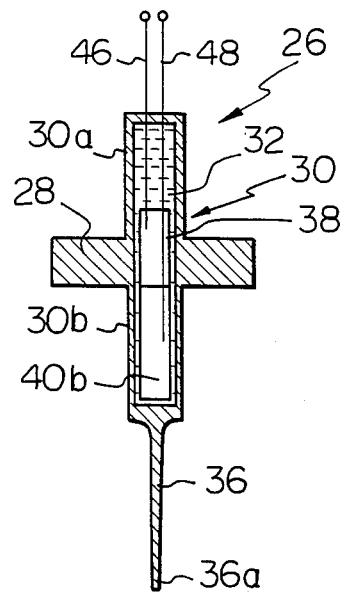
Figure 2E:
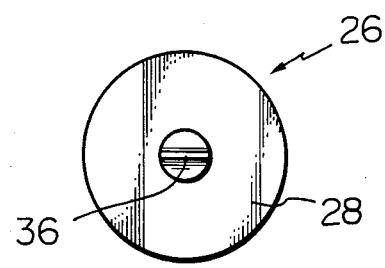
FIG. 2e is a bottom plan view of the pressure sensor shown in FIG. 2c.

In the particular embodiment discussed above, opposite surfaces of the plate 36 in the chamber 20 are so oriented as to be parallel to the direction of the fluid flow in the conduit 10 as shown in FIG. 1a, while the pressure induction passageways 22 and 24 are positioned to individually face both sides of the plate 36 in the chamber 20 as shown in FIG. 1b. This is not restrictive, however, and may be replaced by an arrangement shown in FIGS. 2a-2e in which both sides of the plate 36 extend perpendicularly to the direction of fluid flow while, as shown in FIG. 2b, the pressure induction passageways 22 and 24 individually open into the chamber 20 in such a manner as to face both surfaces of the plate 36. The alternative arrangement shown in FIGS. 2a-2e is successful to suppress the influence of mechanical vibrations of the conduitwork on the accuracy of measurement.

Where the vortex flow meter is applied to a specific kind of fluid such as steam which contains mist, part of the fluid admitted into the pressure sensing chamber 20 via the pressure induction passageways 22 and 24 flows down along the opposite surfaces of the pressure receiving plate 36 to collect itself on the bottom 20a of the chamber 20. As a result, a clearance 50 defined between the chamber bottom 20a and the plate end 36a tends to become stopped up by the collected fluid. This would prevent the plate 36 from moving in response to a pressure variation due to a vortex train and, thereby, make the velocity or flow rate measurement inaccurate. Such a problem is solved by a modification to the first embodiment shown in FIGS. 3a or 3b.

Figure 3B:
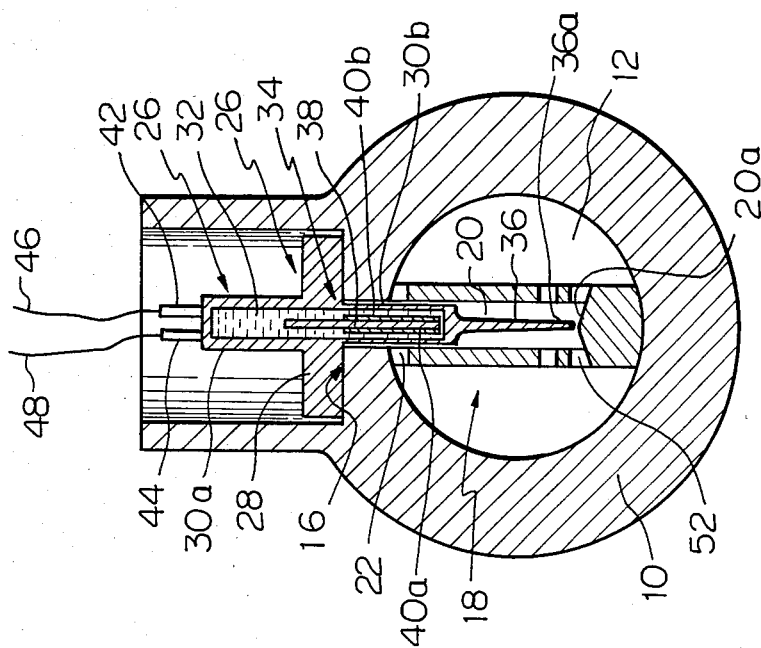
Figure 3A:
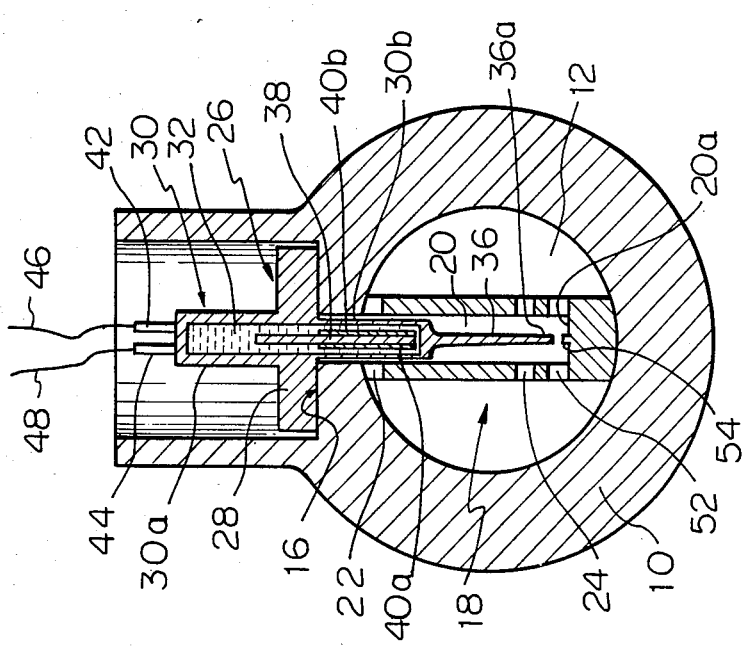

Referring to FIGS. 3a and 3b, the bluff body 18 is formed with drain ports 52 at a level lower than the lower pressure induction passageway 24 and even lower than the lower end 36a of the pressure receiving plate 36. In this construction, part of the fluid flowing down along the plate 36 to reach the bottom 20a of the chamber 20 is effectively discharged to the outside via the drain ports 52. The plate 36, therefore, is capable of responding to pressure variations with accuracy.

To promote more effective discharge of the fluid from the bottom 20a of the chamber 20 via the drain ports 52, a wall 54 facing the lower end 36a of the plate 36 may be formed upright in a central area of the chamber bottom 20a, as illustrated in FIG. 3a. The wall 54 defines the clearance 50 at a level higher than the drain ports 52. Another possible implementation for effective discharge of the fluid is shown in FIG. 3b in which the chamber bottom 20a is inclined downwardly toward the drain ports 52.

While the flange 28 and the thin cylinder 30 of the pressure sensor 26 have been shown and described as being in an integral structure they may be formed as separate members as shown in FIGS. 4a and 4b. In these drawings, the flange 28 has a through bore 56 the inside diameter of which is somewhat larger than the outside diameter of the cylinder 30. Annular support walls 58a and 58b extend away from each other from opposite ends of the flange 28, while defining extensions of the through bore 56 thereinside. When the cylinder 30 is coupled in the through bore 56 of the flange 28, the support walls 58a and 58b extend along the axis of the cylinder 30. After the cylinder 30 is suitably positioned relative to the flange 28, they are welded together by the application of an electron beam, a laser or the like from the outside. Welding with an electron beam, a laser or like means realizes accurate machining eliminating various drawbacks experienced with conventional welding techniques such as thermal distortion due to the large heat capacity.

It will be noted that provision of the two flanges 58a and 58b is not essential and either one of them may be omitted depending upon the operating conditions as well as others.

The plate 36 and cylinder 30 may be formed separately from each other and joined together using an electron beam or a laser, instead of forming them integrally as in the first embodiment.

Figures 5A, 5B:
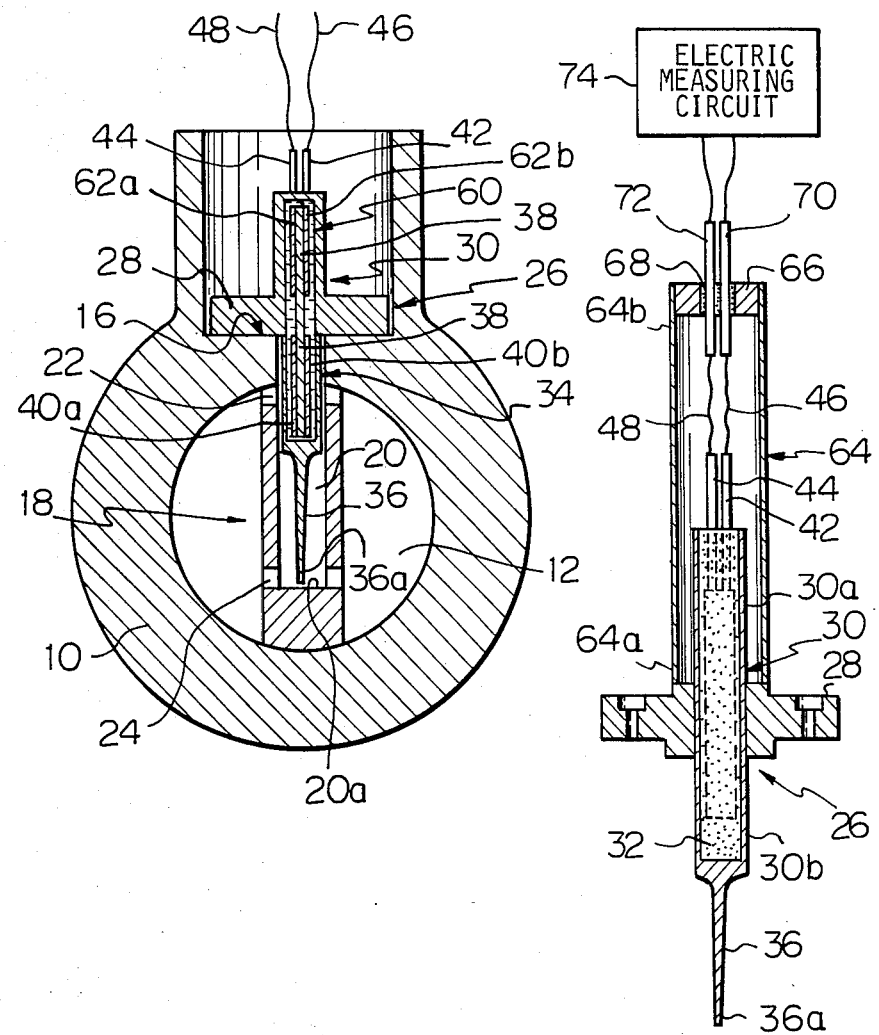
FIGS. 5a and 5b are vertical sections of another embodiment of the present invention.

Now, when various externally derived vibrations are imparted to the pressure sensor 26 by way of the conduit 10, leads 46 and 48 and the like, they would be added to a pressure variation due to a vortex train and thereby introduced into a sensor output as noise, lowering the S/N ratio to a critical extent. Reference will be made to FIGS. 5a and 5b for describing a second embodiment of the present invention which is an approach to overcome such a problematic situation.

Referring to FIG. 5a, the vortex flow meter includes a second sensor member 60 in addition to the sensor member 34 of the first embodiment. The sensor members 34 and 60 are substantially identical in construction and positioned substantially symmetrically to each other with respect to the flange 28. The sensor member 60 shares the resilient substrate 38 with the sensor member 34 and has piezoelectric elements 62a and 62b individually bonded to opposite surfaces thereof. When some external vibration is applied to the pressure sensor 26 via the conduit 10, it acts on both the sensor members 34 and 60. Therefore, if the sensor members 34 and 60 are electrically connected such that vibrations acting thereon cancel each other, only the desired pressure variation component will be converted into an electric signal to set up an excellent S/N ratio in the sensor output.

In FIG. 5b, on the other hand, a lead support tube 64 having a relatively thin wall is rigidly mounted at one end 64a thereof on the flange 28 of the pressure sensor while surrounding the entire cylinder 30. The other end 64b of the lead support tube 64 is hermetically closed by a seal member 66. In this particular embodiment, the leads 46 and 48 extending from the pressure sensor 26 via the terminals 42 and 44 are individually made of a conductor having a relatively small rigidity. The leads 46 and 48 are respectively connected to terminals 70 and 72 which are fixed to the seal member 66 by a molding 68. The terminals 70 and 72 are individually connected to an electric measuring circuit 74. In this construction, if an externally derived vibration is imparted to the pressure sensor 26, propagation thereof will be effectively interrupted by the nonrigid leads 46 and 48 before applied to the piezoelectric elements as noise. If desired, the lead support tube 64 may comprise a bellows.

Various modifications will become possible for those skilled in the art after receiving the teachings of the present disclosure without departing from the scope thereof.

What is claimed is:

1. A vortex flow meter for measuring the flow rate of a fluid flowing through an internal space of a conduit by sensing the pressure variation which occurs in proportion to the flow rate, said vortex flow meter comprising, in combination:

(a) a bluff body disposed in the internal space of the conduit to face the flow of the fluid and having a pressure sensing chamber defined in an internal space of said bluff body for sensing the pressure variation due to vortices generated by the flow of the fluid, said pressure sensing chamber having an upper pressure induction passageway and a lower pressure induction passageway;

(b) a pressure receiving member disposed in the internal space of said bluff body to mechanically oscillate or displace in response to the pressure variation, said pressure receiving member comprising a flat pressure receiving plate which protrudes into the pressure sensing chamber to bisect the chamber;

(c) a cylindrical member mounted in and extending through a wall portion of the conduit and connected to the pressure receiving member at a lower end of the cylindrical member, said cylindrical member having an internal space; and (d) a pressure sensor member disposed in said internal space of said cylindrical member such as to prevent said pressure sensor member from being contacted by the fluid flow in said conduit, said pressure sensor member having imparted thereto the mechanical displacement of said pressure receiving plate to thereby measure the flow rate in said conduit, said pressure sensor member comprising a resilient substrate, a converter element for converting the mechanical displacement of said pressure receiving plate due to the vortices to an electrical signal, said converter element being bonded to at least one of opposite surfaces of said substrate, and an electrically insulative filling agent for fixing said substrate and converter element in the internal space of said cylindrical member.

2. A vortex flow meter as claimed in claim 1, in which the pressure sensing chamber has a drain port in a position lower than the lower pressure induction passageway and lower than a free end of the pressure receiving member, whereby part of the fluid tending to deposit on a bottom wall of the pressure sensing chamber is discharged.

3. A vortex flow meter as claimed in claim 2, in which a wall rises from a central portion of the bottom wall of the pressure sensing member to regulate a clearance which is defined between the pressure receiving member and the bottom wall.

4. A vortex flow meter as claimed in claim 2, in which the bottom wall of the pressure sensing chamber is inclined from a central portion thereof toward the drain port.

5. A votex flow meter as claimed in claim 1, in which the pressure receiving member is oriented parallel to a direction of flow of the fluid at side surfaces thereof.

6. A vortex flow meter as claimed in claim 1, in which the pressure receiving member is oriented perpendicular to a direction of flow of the fluid at side surfaces thereof.

7. A vortex flow meter as claimed in claim 1, further comprising a flange for mounting the cylindrical member on an outer wall of the conduit.

8. A vortex flow meter as claimed in claim 7, in which the cylindrical member and the flange are formed integrally with each other by welding by means of at least one of an electron beam and a laser.

9. A vortex flow meter as claimed in claim 8, in which the flange has an annular support wall at at least one of opposite sides thereof for fixing the cylindrical member in place.

10. A vortex flow meter as claimed in claim 1, in which said converter element comprises a piezoelectric element.

11. A vortex flow meter as claimed in claim 10, in which the piezoelectric element bonded to be substrate is covered with a ceramic material.

12. A vortex flow meter as claimed in claim 1, in which the filling agent comprises glass.

13. A vortex flow meter as claimed in claim 1, further comprising leads for picking out the electrical signal from the sensor member, said leads being individually made of a conductor having a small regidity.

14. A vortex flow meter as claimed in claim 13, further comprising a cylindrical tube for supporting the leads by means of a shield member.

15. A vortex flow meter as claimed in claim 1, in which the cylindrical member accommodates a second pressure sensor member in the internal space thereof.

16. A vortex flow meter as claimed in claim 15, in which the two sensor members are electrically connected to compensate for an externally derived vibration.

17. A vortex flow meter for measuring a flow rate of a fluid flowing through an internal space of a conduit by sensing a pressure variation which occurs in proportion to the flow rate, said vortex flow meter comprising:
  (a) a bluff body disposed in the internal space of the conduit to face the flow of the fluid and having a pressure sensing chamber defined in an internal space thereof, said pressure sensing chamber having an upper pressure induction passageway and a lower pressure induction passageway;
  (b) a pressure receiving member disposed in the internal space of said bluff body to be displaceable in response to the variation;
  (c) a drain port in the pressure sensing chamber in a position lower than the lower pressure induction passageway and lower than a free end of the pressure receiving member, whereby part of the fluid tending to deposit on a bottom wall of the pressure sensing chamber is discharged;
  (d) a wall rising from a central portion of the bottom wall of the pressure sensing chamber to regulate a clearance which is defined between the pressure receiving member and the bottom wall;
  (e) a sensor member arranged to be positioned in a wall portion of the conduit and outwardly thereof; and
  (f) a cylindrical member mounted in the wall portion of the conduit and connected to the pressure receiving member at a lower end thereof, said cylindrical member accommodating the sensor member fixed in place in an internal space thereof.

18. A vortex flow meter for measuring a flow rate of a fluid flowing through an internal space of a conduit by sensing a pressure variation which occurs in proportion to the flow rate, said vortex flow meter comprising:
  (a) a bluff body disposed in the internal space of the conduit to face the flow of the fluid and having a pressure sensing chamber defined in an internal space thereof, said pressure sensing chamber having an upper pressure induction passageway and a lower pressure induction passageway;
  (b) a pressure receiving member disposed in the internal space of said bluff body to be displaceable in response to the pressure variation;
  (c) a drain port in the pressure sensing chamber in a position lower than the lower pressure induction passageway and lower than a free end of the pressure receiving member, the bottom wall of the pressure sensing chamber being inclined from a central portion thereof toward the drain port, whereby part of the fluid tending to deposit on a bottom wall of the pressure sensing chamber is discharged;
  (d) a sensor member arranged to be positioned in a wall portion of the conduit and outwardly thereof, and
  (e) a cylindrical member mounted in the wall portion of the conduit and connected to the pressure receiving member at a lower end thereof, said cylindrical member accommodating the sensor member fixed in place in an internal space thereof.

* * * * *